United States Patent Office 2,829,984
Patented Apr. 8, 1958

2,829,984
PROCESS OF COATING A METAL SURFACE

Luther L. Yaeger, Madison, Wis., assignor to Bjorksten Research Laboratories, Inc., Madison, Wis., a corporation of Illinois No Drawing. Application January 7, 1954
Serial No. 402,826

4 Claims. (Cl. 117—132)

This invention relates to a method and composition for adhering metal surfaces under water and more particularly to such a process comprising reacting a polyepoxide with a diisocyanate, then mixing an amine with the resultant polymeric product and immediately applying the mixture to a metal surface under water.

It is known that polyepoxides such as those obtained by reacting epichlorohydrin with dihydric alcohols or dihydric phenols, can be cured to form resins that are hard and durable and which generally serve very well as adhesives for many materials. Liquid polyepoxides may be cured at low temperatures to provide thermosetting polymeric adhesives which have excellent adhesivity for many materials utilizing as a catalyst or hardening agent any one of a great variety of substances such as mono- and di-carboxylic acids and anhydrides and amino compounds such as ethylene diamine, diethylene, triamine, triethylene tetramine and tetraethylene pentamine.

One of the difficulties of accomplishing the object of this invention is that heat is conducted with extreme rapidity away from a reaction conducted under water and this is especially true of reactions conducted in contact with a metal surface immersed in a cold body of water. Thus an adhesive which may be quite suitable for use under usual circumstances is often altogether unsuitable for use under water and especially for use under water on metal surfaces.

In repairing damage to metal hulls or other under-water structures speed is of the essence. For such an application it is desirable that the curing time be shorter than it has generally been found possible to provide heretofore at the low temperatures usually encountered in working under water in oceans or large lakes. Preferentially for such an application the adhesives should wet the metal surface of the hull or structure to be repaired, replace water and provide a tenacious bond.

It is therefore an object of this invention to provide a method for adhesively attaching articles to metal surfaces under water. Another object is such a process comprising causing a resinous adhesive containing polyepoxide chains to set up extremely rapidly under water in contact with a metal surface.

Further objects and the applicability of the invention will become apparent from the following detailed description in which it is my intention to illustrate the applications of the invention without thereby intending to limit its scope to less than that of all those equivalents which will be apparent to those skilled in the art.

The polyepoxides used in the preparation of the novel products of the invention comprise all those organic compounds containing at least two reactive epoxy

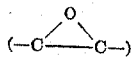

groups in their molecule. The polyepoxides may be saturated or unsaturated, aliphatic, cycloaliphatic, aromatic or heterocyclic and may be substituted if desired with non-interfering substituents. The polyepoxides may be monomeric or polymeric.

For clarity, many of the polyepoxides will be referred to hereinafter in terms of their epoxy equivalency. The term "epoxy equivalency" refers to the number of epoxy groups contained in the average molecule of the desired material. The epoxy equivalency is obtained by dividing the average molecular weight of the polyepoxide by the epoxide equivalent weight. The epoxide equivalent weight is determined by heating one gram sample of the polyepoxide with an excess of pyridinium chloride dissolved in pyridine at the boiling point for 20 minutes. The excess pyridinium chloride is then back titrated with 0.1 N sodium hydroxide to phenolphthalein end point. The epoxide value is calculated by considering one HCl as an equivalent of one epoxide. This method is used to obtain all epoxide values reported herein.

If the polyepoxides are single monomeric compounds having all of their epoxide groups intact, their epoxy equivalency will be whole integers, such as 2, 3, 4, and 5. However, in the case of the polymeric type polyepoxides many of the materials may contain some of the monomeric monoepoxides or have some of their epoxy groups hydrated or otherwise reacted and/or contain macromolecules of somewhat different molecular weight so the epoxy equivalent values may be quite low and contain fractional values. The polymeric material may, for example, have epoxy equivalent values, such as 1.5, 1.8, 2.5 and the like.

The monomeric-type polyepoxide compounds may be exemplified by the following: vinyl cyclohexane dioxide, epoxidized soyabean oil, butadiene dioxide, 1,4-bis(2,3-epoxypropoxy) benzene, 1,3-bis(2,3-epoxypropoxy) benzene, 4,4'-bis(2,3-epoxypropoxy) diphenyl ether, 1,8-bis-(2,3-epoxypropoxy) octane, 1,4-bis(2,3-epoxypropoxy) cyclohexane, 4,4'-bis(2-hydroxy-3,4-epoxybutoxy) diphenyldimethylmethane, 1,3 - bis(4,5-epoxypentoxy)-5-chlorobenzene, 1,4 - bis(3,4-epoxybutoxy)-2-chlorocyclohexane, diglycidyl ether, 1,3 - (2 - hydroxy - 3,4 - epoxybutoxy) benzene, 1,4-bis-(2-hydroxy-4,5-epoxypentoxy) benzene, 1,2,5,6-di-epoxy - 3 - hexyne, 1,2,5,6-diepoxyhexane, and 1,2,3,4-tetra(2-hydroxy-3,4-epoxybutoxy) butane.

Other examples of this type include the glycidyl polyethers of the polyhydric phenols obtained by reacting a polyhydric phenol with a great excess, e. g., 4 to 8 mol excess, of a halogen-containing epoxide in an alkaline medium. Thus 2,2 - bis(2,3 - epoxypropoxyphenyl) propane is obtained by reacting bis-phenol (2,2-bis(4-hydroxyphenyl) propane) with an excess of epichlorohydrin as indicated below. Other polyhydric phenols that can be used for this purpose include resorcinol, catechol, hydroquinone, methyl resorcinol, or polynuclear phenols, such as 2,2-bis(4-hydroxyphenyl) butane, 4,4'-dihydroxybenzophenone, bis(4-hydroxyphenyl) ethane, and 1,5-dihydroxynaphthalene. The halogen-containing epoxides may be further exemplified by 3-chloro-1,2-epoxybutane, 3-bromo-1, 3-epoxyhexane, 3-chloro-1,2-epoxyoctane, and the like.

Examples of the polymeric-type polyepoxides include the polyepoxypolyhydroxy polyethers obtained by reacting, preferably in an alkaline or an acid medium, a polyhydric alcohol or polyhydric phenol with a polyepoxide, such as the reaction product of glycerol and bis-(2,3-epoxypropyl)ether, the reaction product of sorbitol and bis-(2,3-epoxy-2-methylpropyl) ether, the reaction product of pentaerythritol and 1,2-epoxy-4,5-epoxypentane, and the reaction product of bis-phenol and bis(2,3-epoxy-2-methylpropyl) ether, the reaction product of resorcinol and bis(2,3-epoxypropyl) ether, and the reaction product of catechol and bis(2,3-epoxypropyl) ether.

A further group of the polymeric polyepoxides comprises the hydroxy-substituted polyepoxy polyethers obtained by reacting, preferably in an alkaline medium, a slight excess, e. g., .5 to 3 mol excess, of a halogen-containing epoxide as described above, with any of the aforedescribed polyhydric phenols, such as resorcinol, catechol, bis - phenol, bis(2,2' - dihydroxy - dinaphthyl) methane, and the like.

Also included within this group are the polyepoxy polyethers obtained by reacting, preferably in the presence of an acid-acting compound, such as hydrofluoric acid, of one of the aforedescribed halogen-containing epoxides with a polyhydric alcohol, such as glycerol, propylene glycol, ethylene glycol, trimethylene glycol, butylene glycol, and the like, and subsequently treating the resulting product with an alkaline component.

Other polymeric polyepoxide compounds include the polymers and copolymers of the epoxy-containing monomers possessing at least one polymerizable ethylenic linkage. When this type of monomer is polymerized in the substantial absence of alkaline or acidic catalysts, such as in the presence of heat, oxygen, peroxy compound, actinic light, and the like, they undergo addition polymerization at the multiple bond leaving the epoxy group unaffected. These monomers may be polymerized with themselves or with other ethylenically unsaturated monomers, such as styrene, vinyl acetate, methacrylonitrile, acrylonitrile, vinyl chloride, vinylidene chloride, methyl acrylate, methyl methacrylate, diallyl phthalate, vinyl allyl phthalate, divinyl adipate, chloroallyl acetate, and vinyl methallyl pimelate. Illustrative examples of these polymers include poly(allyl 2,3-epoxypropyl ether), poly(2,3-epoxypropyl crotonate), allyl 2,4-epoxypropyl ether-styrene copolymer, methallyl 3,4-epoxybutyl ether-allyl benzoate copolymer, poly(vinyl 2,3-epoxypropyl ether), allyl glycidyl ether-vinyl acetate copolymer and poly(4-glycidyloxystyrene).

Particularly preferred groups of epoxy-containing organic materials to be employed in the process of the invention are the members of the group consisting of the organic compounds possessing a plurality of epoxyalkoxy radicals, e. g., 2 to 4, joined to an organic radical which contains from one to two aromatic rings, organic compounds possessing a plurality of epoxyhydroxyalkoxy radicals, e. g., 2 to 4, joined to an organic radical containing from one to two aromatic rings, the polyepoxy-containing polymeric reaction product of an aromatic polyhydric phenol and epihalohydrin, the polyepoxy-containing polymeric reaction product of an aliphatic polyhydric alcohol and epichlorohydrin, the polyepoxy-containing polymeric reaction product of a polyhydric phenol and a polyepoxide compound, the poly-epoxy-containing polymeric reaction product of an aliphatic polyhydric alcohol and a polyepoxide compound, the polymers of the epoxy-containing monomers possessing at least one polymerizable ethylenic linkage prepared in the absence of alkaline or acidic catalysts, and copolymers of the foregoing epoxy-containing monomers and a monomer containing at least one $CH_2{=}C{=}$ group prepared in the absence of alkaline or acidic catalysts. The expression "epoxy-alkoxy" radicals refers to an alkoxy radical substituted with an epoxy group. The expression "epoxy-hydroxyalkoxy radical" refers to an alkoxy radical substituted with a hydroxyl and epoxy group.

Isocyanates which are suitable for the invention include organic radicals having substituted thereon at least two —NCO groups such as for example m- and p-phenylene diisocyanate, p,p'-diphenyl diisocyanate and substitution products thereof such as diphenyl-3,3'-dimethyl (or -dimethoxy)-4,4'-diisocyanate; 1,5-naphthalene diisocyanate; diphenyl methane-4,4'-diisocyanate; tetra-, penta-, hexa-, hepta-, and octa-methylene diisocyanate; meta-tolylene diisocyanate; 2,4'-diphenylene diisocyanate; 1-chloro-2,4-phenylene diisocyanate; 2,4-phenylene diisocyanate; cyclohexylene diisocyanate; and mixtures of tolylene diisocyanate such as a mixture of 2,4-tolylene diisocyanate and 2,6-tolylene diisocyanate.

Although I do not wish to be limited by any particular theory as to the mechanism which occurs, it appears that the isocyanate groups very likely react with the hydroxy groups in the alkyl chains of the polyepoxides. This reaction may be represented as follows:

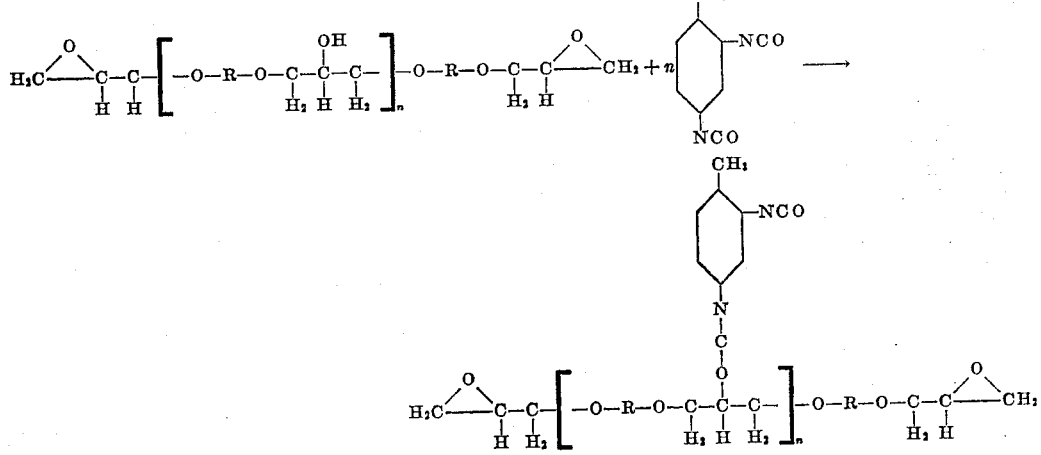

wherein R represents the divalent hydrocarbon radical of the dihydric phenol and $n$ is a whole number.

The resultant molecule exhibits polyfunctionality with respect to hardening agents instead of the difunctionality exhibited by the polyepoxide molecule. A hardening agent molecule may thus react with either epoxy

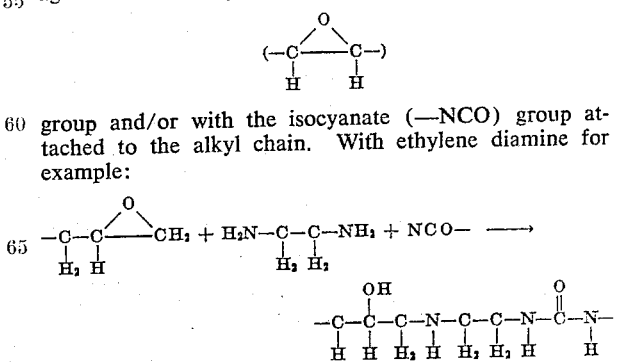

group and/or with the isocyanate (—NCO) group attached to the alkyl chain. With ethylene diamine for example:

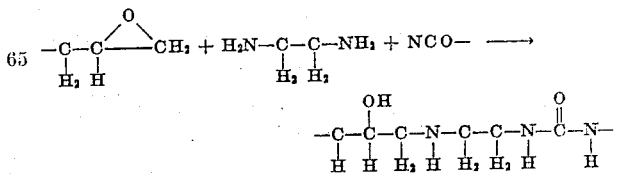

Cross-linking is thus greatly facilitated since the probability of contact between a reactive radical on a hardening agent molecule and a reactive molecule on the polymer chain molecule is greatly increased.

The following examples further illustrate the invention.

Hydroxyl values were determined by the lithium aluminum hydride method.

Example I 100 parts polyepoxide resin having a hydroxyl value of .25 and an epoxide equivalency of .64, prepared by reacting dihydric phenol comprising principally bis-phenol with epichlorohydrin in the presence of an alkali 15 parts m-tolylene diisocyanate The above ingredients were mixed and heated at 120° C. to 130° C. for 30 minutes. The product was a viscous liquid.

Example II 100 parts polyepoxide resin having a hydroxyl value of .25 and an epoxide equivalency of .64, prepared by reacting dihydric phenol comprising principally bis-phenol with epichlorohydrin in the presence of an alkali 30 parts m-tolylene diisocyanate The resultant products from Examples II and III when cooled to room temperature were nearly solid. They were blended with an additional 100 parts of the above polyepoxide resin to reduce the viscosity and provide very viscous liquids.

Example III 100 parts polyepoxide resin having a hydroxyl value of .25 and an epoxide equivalency of .64, prepared by reacting dihydric phenol comprising principally bis-phenol with epichlorohydrin in the presence of an alkali 50 parts m-tolylene diisocyanate A portion of the product of each of the above examples is mixed with each of the following hardening agents in the proportions shown:

- 10% ethylene diamine
- 6% tetraethylene pentamine
- 8% ethyl amine
- 7% hydroxyl amine
- 3% hydrazine
- 12% isopropyl amine
- 7% ethanol amine
- 6% phenylene diamine The resultant curing action is extremely exothermic and accomplished with considerable rapidity. When the reactions were carried out in bulk in the absence of water the resin became charred as a result of the heat of reaction produced during curing.

Thus it may be seen that a preferred hardening agent is a compound containing amino nitrogen and more particularly a compound having the formula:

$$H_2N-R$$

wherein R contains C and H and may contain N and —OH.

Each of the products of the above examples is found to function quite suitably as an adhesive for steel and aluminum plates immersed in water at 0 to 4° C.

The particular method of applying the adhesive is not a part of the invention. It may be brushed onto the surfaces to be adhered or may be squeezed onto the surfaces through an orifice contained in a collapsible metal or plastic tube or bag. Surfaces with adhesive applied thereto may be placed together to provide a joint. The application may be carried out under water. It may be carried out in the air if the surface is immediately immersed in water after application, using such surfaces as those plates applied to exterior surfaces of hulls in order to close holes therein.

It will thus be seen that the invention is broad in scope and is to be interpreted as including all those equivalents which will be apparent to those skilled in the art and is to be limited only by the claims.

Having thus disclosed my invention, I claim:

1. The process of making and utilizing an adhesive composition comprising: reacting 100 to 200 parts of a polyepoxide with 15 to 50 parts of a diisocyanate, then adding to the resulting polymeric product 3% to 12% of a compound containing amino nitrogen, and then applying the resultant mixture before substantial curing thereof to a solid metal surface under water.

2. The process of making and utilizing an adhesive composition comprising: reacting 100 to 200 parts of a polyepoxide with 15 to 50 parts of a diisocyanate, then adding to the resulting polymeric product 3% to 12% of a compound selected from the group having the formula:

$$H_2N-R$$

wherein R contains C and H, and then applying the resultant mixture before substantial curing thereof to a solid metal surface under water.

3. The process of making and utilizing an adhesive composition comprising: reacting 100 to 200 parts of a polyepoxide with 15 to 50 parts of a diisocyanate, then adding to the resulting polymeric product 3% to 12% of a compound containing amino nitrogen, then applying the resultant mixture before substantial curing thereof to a solid metal surface, and then allowing the resultant exothermic reaction to take place under water until hard, tough material is formed.

4. The process of making and utilizing an adhesive composition comprising: reacting 100 to 200 parts of a polyepoxide with 15 to 50 parts of a diisocyanate, then adding to the resulting polymeric product 3% to 12% of a compound selected from the group having the formula:

$$H_2N-R$$

wherein R contains C and H, and then applying the resultant mixture before substantial curing thereof to a solid metal surface, and then allowing the resultant exothermic reaction to take place under water until hard, tough material is formed.

References Cited in the file of this patent

UNITED STATES PATENTS

| | | |
|---|---|---|
| 2,594,979 | Nelson | Apr. 29, 1952 |
| 2,633,458 | Shokal | Mar. 31, 1953 |
| 2,643,239 | Shokal | June 23, 1953 |
| 2,650,212 | Windemuth | Aug. 25, 1953 |

U. S. DEPARTMENT OF COMMERCE
PATENT OFFICE

CERTIFICATE OF CORRECTION

Patent No. 2,829,984 April 8, 1958

Luther L. Yaeger

It is hereby certified that error appears in the printed specification of the above numbered patent requiring correction and that the said Letters Patent should read as corrected below.

Column 3, line 54, for "2,4-epoxypropyl" read --2,3-epoxypropyl--.

Signed and sealed this 27th day of May 1958.

(SEAL)
Attest:
KARL H. AXLINE
Attesting Officer

ROBERT C. WATSON
Commissioner of Patents